United States Patent [19]

Alston

[11] 4,454,989
[45] Jun. 19, 1984

[54] SPRINKLING HOSES

[76] Inventor: George K. Alston, Box 4, Frannie, Wyo. 82423

[21] Appl. No.: 325,658

[22] Filed: Nov. 30, 1981

[51] Int. Cl.³ .............................................. B05B 1/20
[52] U.S. Cl. .................................. 239/269; 239/276; 239/286; 239/547
[58] Field of Search .............. 239/547, 266, 269, 276, 239/286

[56] References Cited

U.S. PATENT DOCUMENTS 2,716,574  8/1955  Chase ................................. 239/547
2,954,194  9/1960  Alfano ........................... 239/276 X
3,459,377  9/1969  Van der Hulse ............... 239/551 X Primary Examiner—Andres Kashnikow
Assistant Examiner—Mary F. McCarthy
Attorney, Agent, or Firm—Horace B. Van Valkenburgh

[57] ABSTRACT

A hollow hose has a series of preformed triangular units or sections in connected sequence, with one leg of each unit adapted to engage the ground when the hose is stretched to correspond to the length of the area to be sprinkled. The upwardly extending and downwardly extending legs of each unit or section have outwardly disposed holes, through which the liquid for sprinkling is discharged. For a shorter hose, the holes may be of the same diameter, but for longer hoses smaller holes at the inlet end and larger holes at the opposite end may be used, with intermediate size holes between for still longer hoses. Special stakes for holding the bottom legs at opposite ends to the ground may include an arcuate notch for engaging the corresponding hose portion and a stem alongside the notch for penetrating the ground. A transverse flange, opposite the stem, is used in driving the stake and each flange has an aperture for receiving the stem of the opposite stake, when clamping the bottom legs of the units between the stakes for storage purposes. With the hose sections in longitudinal alignment and compressed together, a first stake may be placed longitudinally on the inside of the bottom legs and the stem of the second stake slipped into a round hole in the flange of the first stake as the second stake is placed against the underside of the bottom legs. Then, the stem of the first stake is slipped into a transverse slot in the flange of the second stake, which slot has an offset at its inner end to prevent the stem of the first stake from slipping out. The position of the apertures should be such that the bottom legs of the hose sections will be clamped or compressed between the stakes.

8 Claims, 16 Drawing Figures

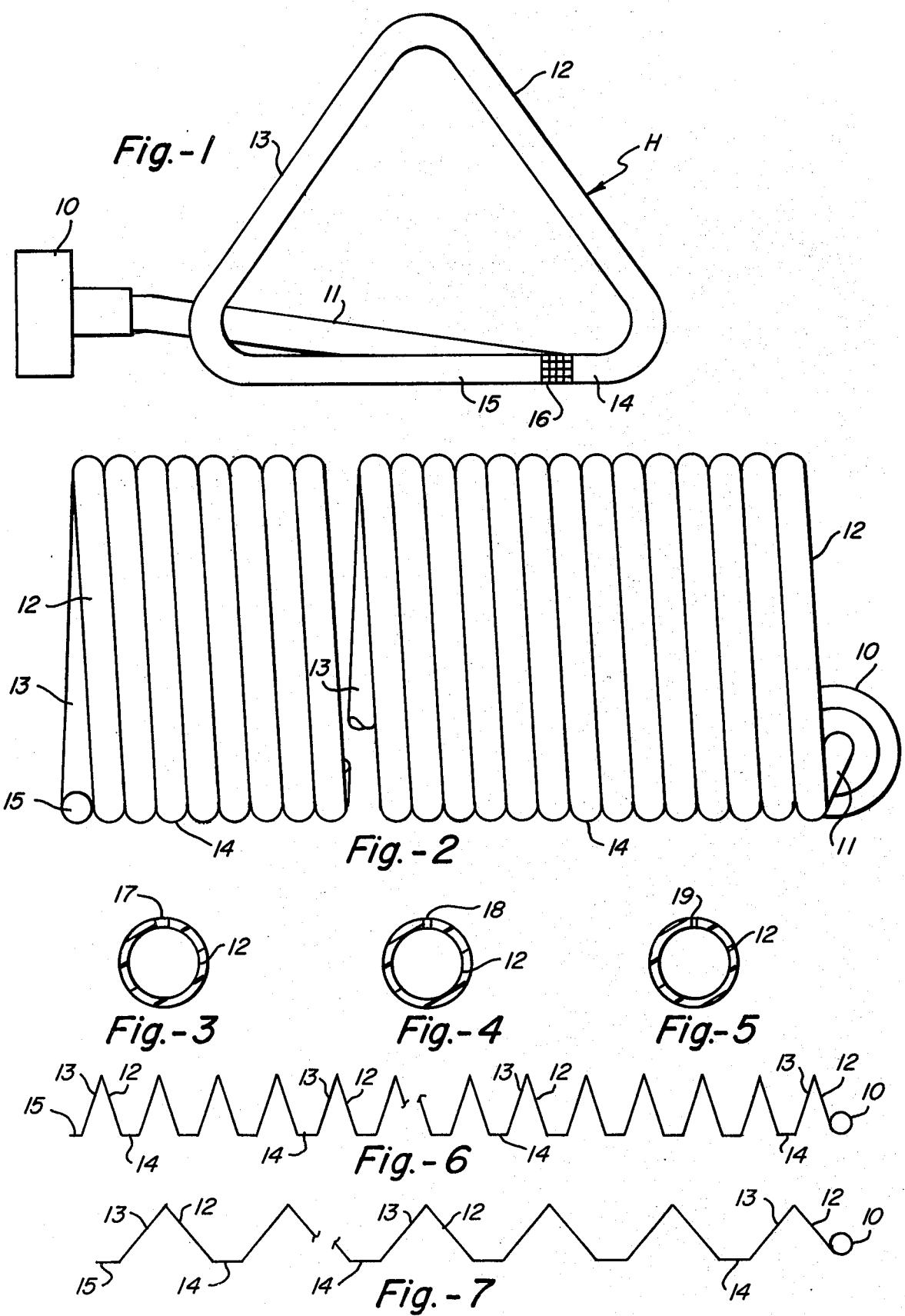

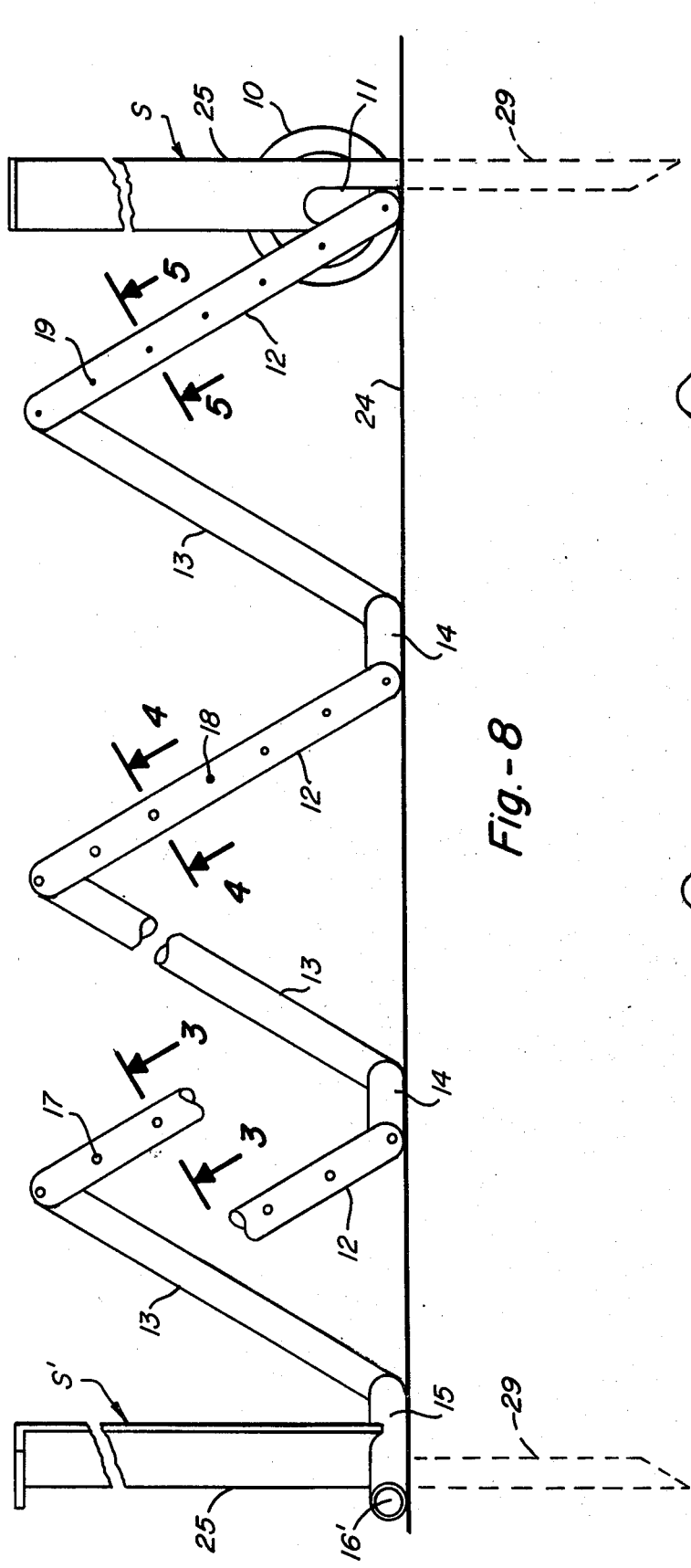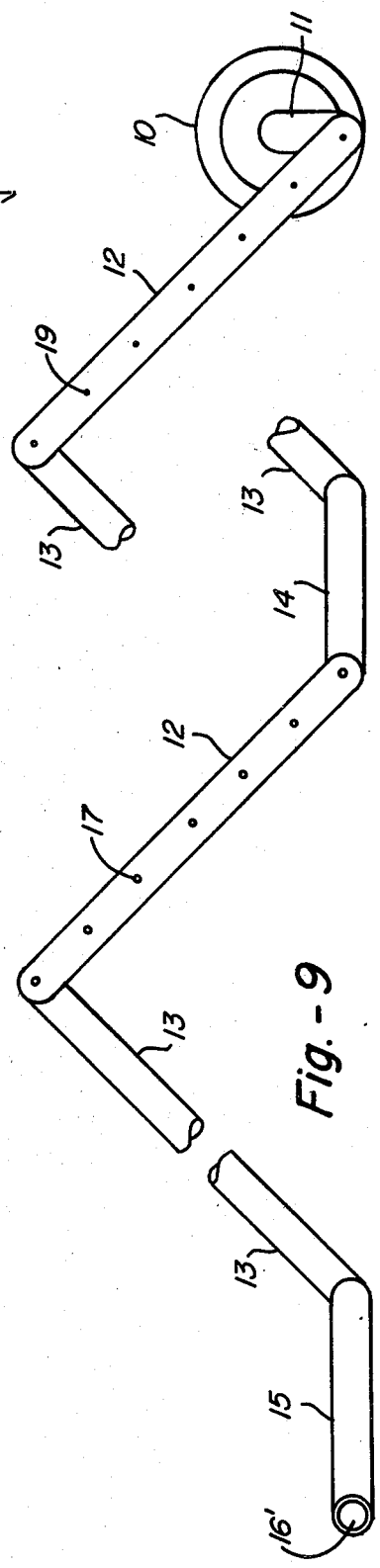
Fig.-8
Fig.-9

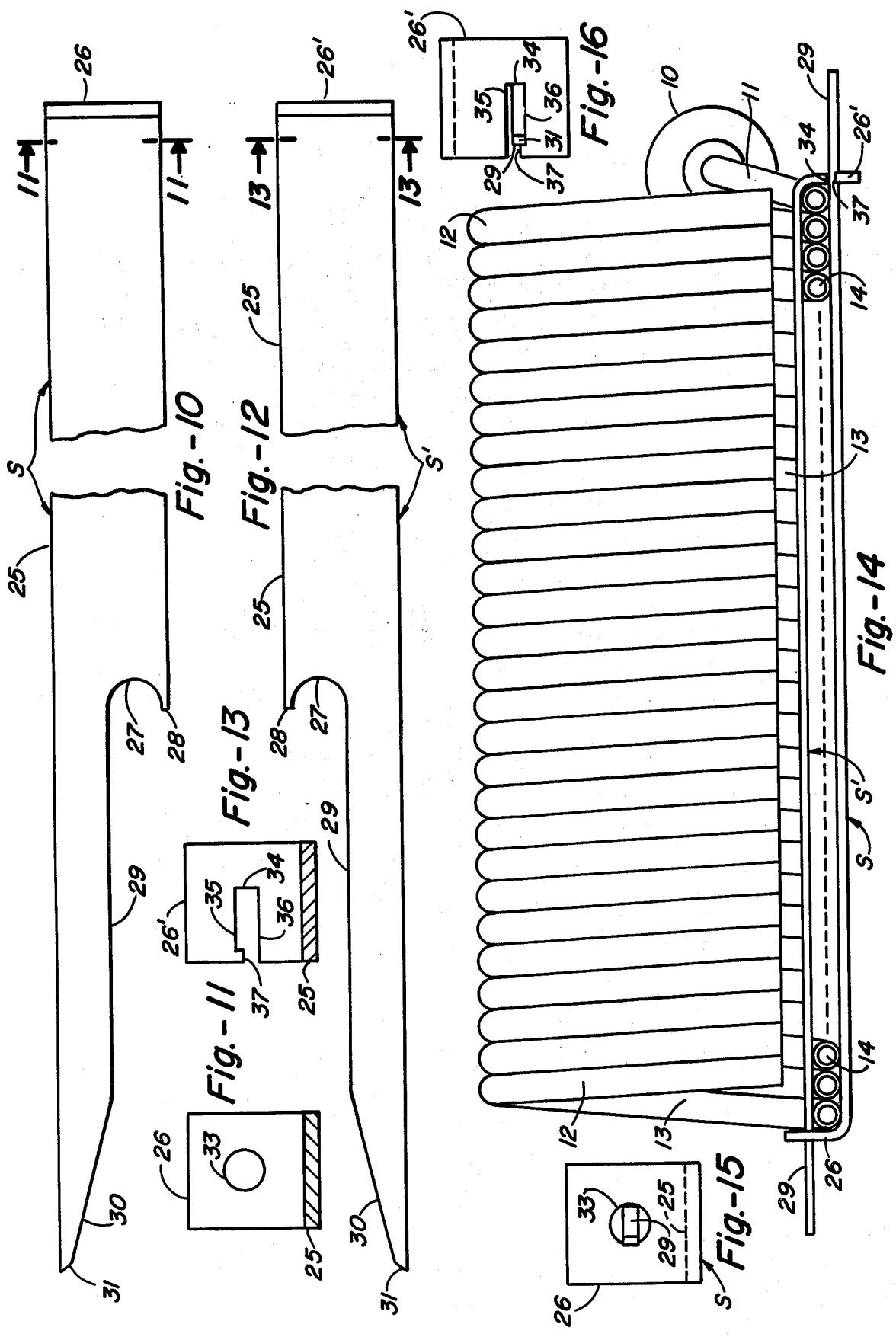

SPRINKLING HOSES

This invention relates to sprinkling hoses.

BACKGROUND OF THE INVENTION

This invention is an improvement over the sprinkling hose of the Kenneth I. Van der Hulse U.S. Pat. No. 3,459,377, which discloses a spiral sprinkling hose having outside holes 180° apart, with a collar associated with each hole and having different sized outlets for spraying water outwardly from the hose. Each collar is adjustable to cause a selected outlet to coincide with the respective hole. The concept of this construction is that it may be extended or retracted longitudinally to cover an area having a greater or lesser length, while the collars may be adjusted to provide a variation in the spray pattern, as for greater or lesser width of the area to be sprayed.

SUMMARY OF THE INVENTION

A hose of this invention consists of a series of pre-formed triangular units in connected sequence, each unit having an upwardly extending leg connected to a downwardly extending leg, in turn connected to a bottom leg which is adapted to engage the ground when the hose is stretched to a distance corresponding to the length of the area to be watered. Holes in the upwardly extending legs and downwardly extending legs spray water outwardly from the respective position of each of these legs. The distance to which the water is sprayed may be controlled by the pressure of the water supplied to the inlet end of the first unit in sequence. For short lengths of hose, the holes may be of essentially the same size but for longer length of hose, the holes may vary in size from the inlet end to the opposite end, with the hole size increasing from the inlet end to the opposite end. Holes of two sizes, or three sizes, with the sizes increasing in diameter from the inlet toward the opposite end, to compensate for the drop in pressure along the hose, not only due to friction produced by flow but also due to a diminution in the volume due to passage of water through holes in previous units. Special stakes may be utilized in attaching to the ground an inlet section and the bottom leg at the opposite end, such stakes having a ground penetration stem of lesser width, tapering at the bottom end and extending from an arcuate notch adapted to engage the respective inlet section or opposite end leg of the hose. The stakes may have a length corresponding to slightly more than the distance occupied by the bottom legs when the hose units are compressed together, so that one stake may be placed on the underside of the bottom legs and the other stake on the upper side of the bottom legs. A lateral flange at the top of each stake may be provided with a hole to receive the tapered end of the opposite stake. For one flange, this hole may be circular so that the tapered end of the opposite stake may be inserted therein, and for the other flange this hole may be a notch having an offset which abuts the tapered end of the opposite stake and retains the opposite stake, through pressure exerted by compression of the bottom legs of the hose units.

THE DRAWINGS

FIG. 1 is an end elevation of a sprinkling hose constructed in accordance with this invention, shown in a storage or collapsed position.

FIG. 2 is a condensed side elevation of the hose in storage position.

FIG. 3 is a cross section on an enlarged scale and taken along line 3—3 of FIG. 8, adjacent the outer end of the hose.

FIG. 4 is a cross section, on an enlarged scale and taken along line 4—4 of FIG. 8, at an intermediate position of the hose.

FIG. 5 is a cross section, on an enlarged scale and taken along line 5—5 of FIG. 8, adjacent the inner end of the hose.

FIG. 6 is a condensed diagrammatic illustration, on a small scale, showing the hose stretched to one predetermined length.

FIG. 7 is a condensed diagrammatic illustration, similar to FIG. 6 but showing the hose stretched to a greater length.

FIG. 8 is a condensed side elevation of the hose, on a scale similar to that of FIG. 2, but showing the hose stretched to the length shown in FIG. 6 and also showing a pair of stakes by which the hose is held in a desired stretched position.

FIG. 9 is a condensed side elevation of the hose, also on a scale similar to that of FIG. 2 but showing the hose stretched to the length shown in FIG. 7.

FIG. 10 is a condensed side view of one of the stakes of FIG. 8, on a slightly larger scale but with the stake in a horizontal position, as when used for storage of the hose.

FIG. 11 is a cross section taken along line 11—11 of FIG. 10.

FIG. 12 is a condensed side view similar to FIG. 10 but showing the opposite stake of FIG. 8.

FIG. 13 is a cross section taken along line 13—13 of FIG. 12.

FIG. 14 is a side elevation of the hose in storage position, utilizing the stakes of FIGS. 10 and 12, but partially broken away to show a longitudinal section of the lower turns which are clamped between the two stakes when interlocked.

FIG. 15 is an end view, on an enlarged scale, showing the interlocked ends of the two stakes, at the left end of the assembly of FIG. 14.

FIG. 16 is a similar enlarged view of the opposite ends of the interlocked stakes.

DESCRIPTION OF THE PREFERRED EMBODIMENT

A hose H, constructed in accordance with this invention, and as in FIGS. 1 and 2, is provided with a faucet connector 10 attached to an inlet section 11, which in turn extends to a series of pre-formed triangular units in sequence, each unit having an upwardly extending leg 12 connected at its top to a downwardly extending leg 13, in turn connected to a bottom leg 14, which connects with the upwardly extending leg 12 of the next triangular unit. As will be evident, the upwardly extending leg 12 of each unit connects with the downwardly extending 13 of the same unit while the downwardly extending leg of each unit, except the last, connects with the bottom leg 14. The downwardly extending leg 13 of the last unit connects with an end leg 15 having a closure 16 at its terminal end. Closure 16 may be a seal of any suitable type, such as a heat seal produced by the end of the tube flattened and fused together, or a plug such as plug 16' of FIGS. 8 and 9. Hose H may be made from any suitable material which can be formed into and will retain a triangular shape of the successive units, such as a plastic having properties similar to polyethylene.

In further accordance with this invention, each of the upwardly extending legs 12 and downwardly extending legs 13 is provided on the outside with sprinkling holes which preferably vary in diameter from the inner toward the outer end, such as larger holes 17 shown in FIGS. 3 and 8, intermediate holes 18 shown in FIGS. 4 and 8 and smaller holes 19 shown in FIGS. 5 and 8. As will be evident, the holes increase in size from the inner end toward the outer end of the hose, to compensate for the drop in water pressure as the water passes through the hose from the inner to the outer end, occasioned not only by friction due to resistance to flow in the hose, but also loss of water due to flow through the holes. Holes 17, 18, and 19 may be produced through drilling, punching, or piercing by a pin or needle of an appropriate size or in any other suitable manner. Different sized holes in the hose may be produced by instruments of appropriate diameter, positioned on a jig or fixture constructed so that all the holes may be produced in one leg of a hose unit. Or, all of the holes on one side, as for the up leg 12 of all the units, may be produced simultaneously, while all of the holes in the opposite legs, i.e. the down legs 13, may be produced simultaneously, when the hose units are in a stacked position, as in FIGS. 2 and 14. Although a gradation from smaller to larger holes from the inner end of the hose to the outer end thereof would appear to be theoretically desirable, for a hose which is to cover an area having a length of up to 50 feet, three different sizes of the holes can approximate the desired sizes, with a smaller size used for the inner one-third of the hose, an intermediate size for the intermediate one-third of the hose, and a larger size for the outer one-third of the hose. More than three sizes of holes may prove desirable for hoses utilized to cover an area of a greater length, as well as a lesser number of hole sizes for hoses utilized to cover an area of a lesser length, such as one size only for an area having a length of on the order of 20 feet or less.

In FIGS. 6 and 8, the hose is shown as stretched from the stacked position of FIG. 2 to an extended position, as in FIG. 6, in which each leg 12, 13, and 14 of each unit or the connection between adjacent legs is flexed to extend angularly to a plane transverse to the longitudinal center line of the hose. In this way, the hose may be extended to a predetermined length, in order to cover an area having the same length. Variations in the width of the area covered by the water discharged from the hose may be produced by regulating the pressure of water delivered to inlet 11 of the hose. When an area having a longer length is to be watered, as in FIG. 8, the hose may be stretched to such longer length, with the angle between the legs and the longitudinal center line of the hose varying in a corresponding manner. Again, for a variation in the width of the area to be watered, the pressure of the water delivered to the inlet 11 of the hose may be controlled accordingly.

Since the hose must be made of at least somewhat resilient material, in order to be extended to different lengths, it is desirable to attach both the inlet section 11 and the end section 15 to the ground 24, as by stakes S and S' of FIG. 8. The stakes may be driven into the ground to hold the hose units a desired distance apart, as well as to prevent them from twisting relative to one another in a spiral direction. Each stake S and S', as in FIGS. 10 and 12, may be formed from a strip 25, as of aluminum, of a predetermined length and having a flange 26 or 26' at one end. A notch 27, which leaves a rib 28 and is adapted to engage the inlet section 11 or end leg 15, respectively, as in FIG. 8, may be provided at a suitable distance from the opposite end. From the respective notch 27, each stake may be provided with a ground penetration stem 29 of reduced width and having a taper 30 extending to a point 31, to facilitate driving each stake into the ground. Stem 29 of the respective stake extends downwardly along one side of inlet 11 and end leg 15. Flanges 26 and 26' of the respective stakes may be provided with different types of apertures for engaging the stem of the other stake when locking the bottom legs 14 in a longitudinally stacked relation of the units, as in FIG. 14. Thus, as in FIG. 11, flange 26 of stake S' may extend, as in FIG. 15. However, flange 26' of stake S', as in FIG. 13, may be provided with a circular hole 33 through which stem of stake S' may extend, as in FIG. 15. However, flange 26' of stake S', as in FIG. 13, may be provided with a transverse slot 34 extending inwardly from one edge and having sides 35 and 36, with the side 35 opposite the stake body being provided with an ear 37, so that stem 29 of stake S may be moved into the notch 34 and into a locking position against offset 37, as in FIG. 16. The location of hole 33 and slot 34 in the respective flanges 26 and 26' is selected so that the bottom legs 14 will be under compression when clamped between stakes S and S', so that the resultant force will maintain stem 29 of stake S against side 35 of slot 34, while ear 37 will prevent stake S from slipping out of the slot. When installing stakes S and S' in the position of FIG. 14, after the turns of the hose have been moved together, in alignment, stake S' may be inserted, from one end, along the top of abutting bottom legs 14, a number of which have been omitted in FIG. 14 but indicated by a dotted line, until flange 26' abuts one end of the stacked hose, such as inlet 11. Then, hole 33 of flange 26 may be inserted over the extending stem 29 of stake S' and moved against the underside of bottom legs 14 so that the bottom legs 14 are compressed, then slipped past ear 37 into slot 34 of flange 26, as in FIG. 16. Upon release, the remaining compression of bottom legs 14 will maintain stem 29 of stake S against ear 37 and within slot 34. The assembly of hose and stakes may be stored temporarily or for a longer period of time, as over the winter season, with the convenience of compactness and the hose not being loose. The assembled hose may also be placed in an upright position on the ground, with the extending portion of stem 29 of stake S', shown at the left in FIG. 14, pushed into the ground to hold the assembly in upright position.

Although a preferred embodiment of the hose of this invention has been illustrated and described, it will be understood that other embodiments may exist and that other changes and variations may be made, without departing from the spirit and scope of this invention.

What is claimed is:

1. A hollow sprinkling hose, comprising:
   a series of connected, preformed, generally triangular, similar sections, two corresponding legs of substantially each section having apertures for the outward discharge of liquid therethrough and the third corresponding leg of each section being imperforate, said hose being formed of a material which will permit lengthwise stretching of the hose through limited flexing of the connections between adjacent legs and flexing of said adjacent legs;

means at one end of said hose connectable to a supply of sprinkling liquid;

said triangular sections permitting said hose to be stretched longitudinally to different distances to vary the length of area to be sprinkled, with said third, imperforate leg of each section engaging the surface to be sprinkled; and means for maintaining said imperforate legs in engagement with the surface to be sprinkled and simultaneously maintaining the length of the area to be sprinkled.

2. A hose as defined in claim 1, wherein:

said apertures differ in size between the ends of said hose, with a smaller size adjacent the supply end and a larger size adjacent the opposite end.

3. A hose, as defined in claim 2, wherein:

said apertures are smaller in size adjacent said supply end, larger in size adjacent said opposite end and intermediate in size between the smaller and larger apertures.

4. A hose as defined in claim 1, wherein:

said hose maintaining means comprises at least two stakes having means for abutting a leg adjacent an end of said hose and a stem for penetrating the surface on which said leg rests.

5. A hose as defined in claim 4, wherein:

said abutting means comprises a notch adjacent said stem.

6. A hollow sprinkling hose comprising:

a series of connected, preformed, generally triangular, similar sections, two corresponding legs of substantially each section having apertures for the outward discharge of liquid therethrough and the third corresponding leg of each section being imperforate;

means at one end of said hose connectable to a supply of sprinkling liquid;

said hose being stretchable, whereby said sections may be stretched apart to different distances to vary the length of area to be sprinkled, with said third, imperforate leg of each section engaging the surface to be sprinkled;

at least two stakes having means for abutting a surface engaging leg adjacent each opposite end of said hose for maintaining said legs in a position in which said hose is stretched a distance corresponding to the length of the area to be sprinkled;

each said stake is provided with a stem for penetrating the surface on which said leg rests and a transverse flange opposite said stem; and each said flange is provided with an aperture for receiving the stem of the opposite stake, whereby said hose may be compressed longitudinally so that said sections are in abutting relation with corresponding legs of said sections in longitudinal alignment and said pair of stakes may be placed on opposite sides of corresponding legs of said sections with each stem received in the aperture of the flange of the opposite stake.

7. A hose as defined in claim 6, wherein:

said apertures are located in the respective flanges so that with said stems of said stakes received in said apertures, the section legs between said stakes will be compressed by said stakes.

8. A hose as defined in claim 7, wherein:

said aperture in the flange of a first stake is a hole, for receiving said stem of a second stake;

said aperture in said flange of said second stake is a lateral notch for receiving said stem of said first stake, said notch having an offset at its outer edge to maintain said stem in said notch through said compression of said section legs.

* * * * *